United States Patent Office 2,880,875
Patented Apr. 7, 1959

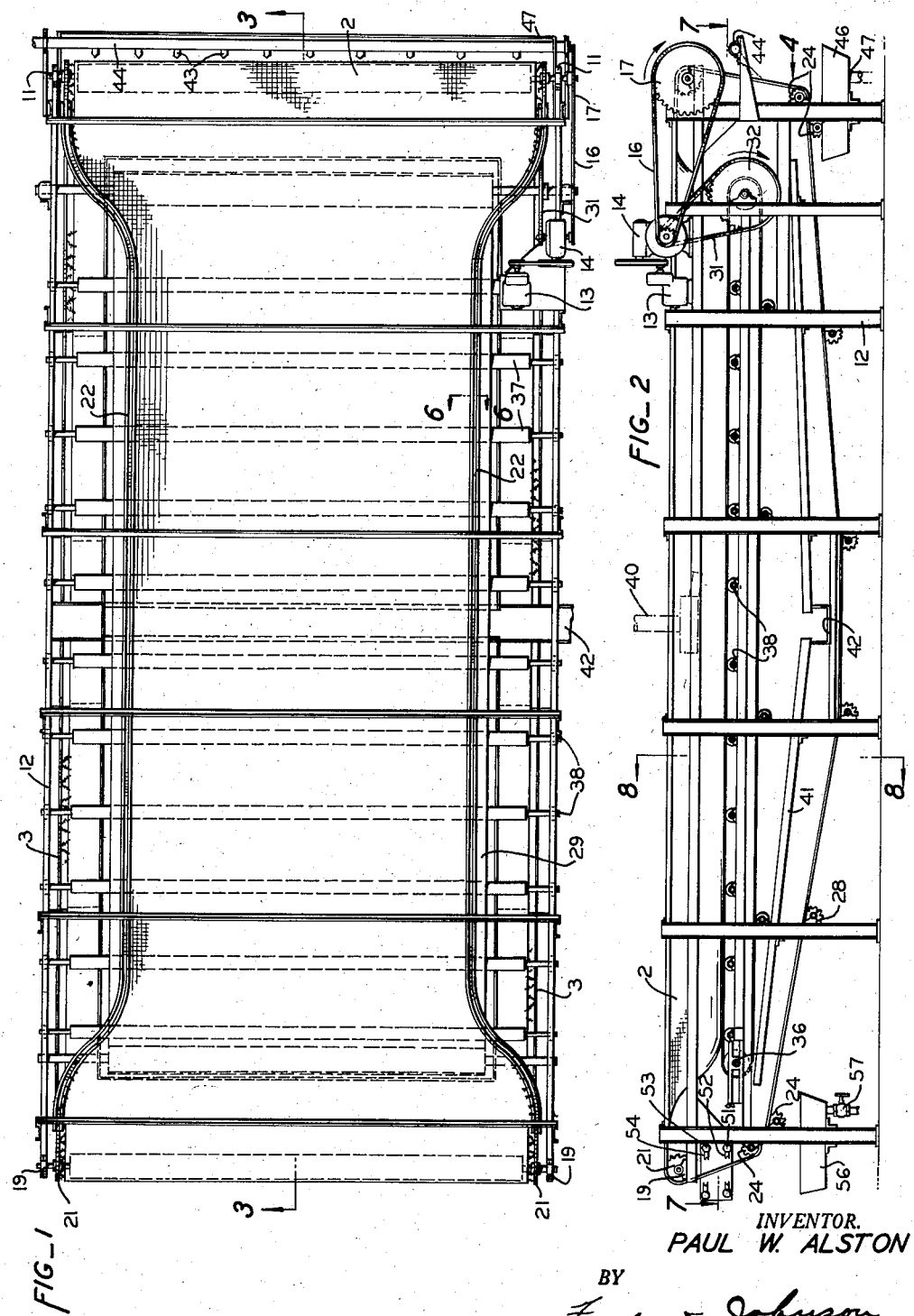

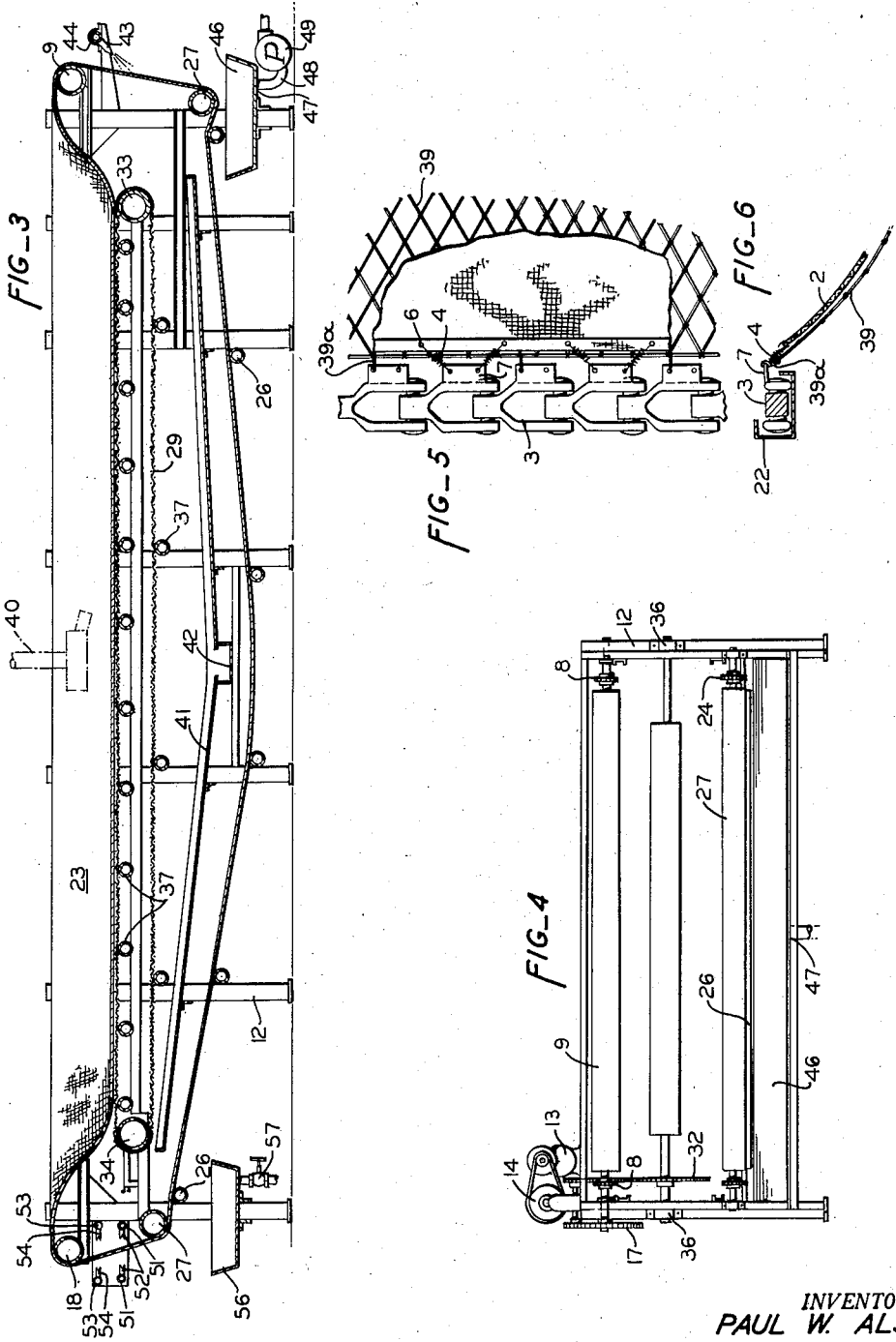

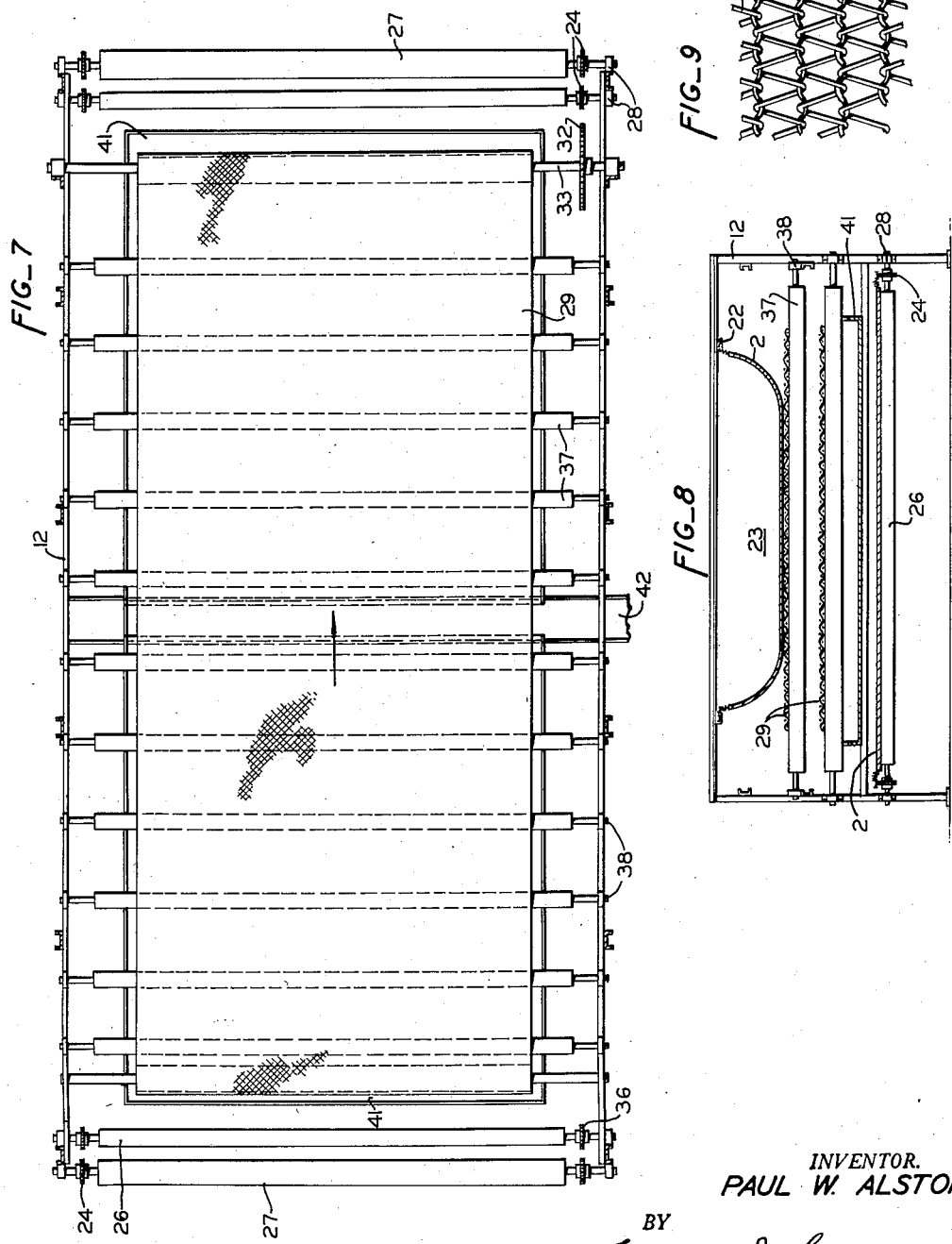

2,880,875

FILTRATION APPARATUS AND METHOD

Paul W. Alston, Berkeley, Calif.

Application December 12, 1955, Serial No. 552,549

6 Claims. (Cl. 210—401)

This invention relates to the separation of liquids from solids by filtration, and more particularly to a filtration apparatus and method utilizing a moving filter medium for the discharge of precipitate deposited thereon.

In the chemical process industries there are many operations in which it is necessary to separate a precipitate from the solution in which the precipitate has formed. Hard granular precipitates are readily filtered, since they form a relatively incompressible cake on the filter medium, and the flow of the filtrate becomes greater as the pressure caused by the head of the liquid being filtered is increased. However, soft fragile precipitates form a highly compressible cake on the filter medium which rapidly becomes relatively impervious to liquid. An increase in pressure caused either by a greater head of liquid being filtered or by use of a vacuum underneath the filter medium only renders the cake of soft precipitate more impermeable, and usually reduces the rate of filtration. With soft precipitates of this type, it is frequently difficult to obtain a satisfactory rate of filtration even when conventional granular filter aids are placed on the filter medium to enhance filtration.

Summarizing this invention, it comprises the provision of a filtration apparatus and method in which the precipitate is discharged by a moving filter medium. The filter medium is in the form of an endless belt of flexible filter fabric which desirably rotates continuously during the filtration operation. The liquid being filtered is deposited on the filter medium and passes through the filter to a filtrate collecting tray, whereas the precipitate is carried along and discharged from the rotating filter belt.

By this arrangement an area of the filter belt free from precipitate is continuously presented for the filtration process, and the layer of precipitate formed on the filter medium is removed before it becomes thick. The resultant relatively thin layer of precipitate formed on the moving filter medium is readily penetrated by the liquid being filtered. Furthermore, rapid filtration is obtained with a low head of liquid pressure which does not tend to compress the precipitate into an impervious cake. Although this invention is particularly useful for the filtration of any type of soft compressible precipitate, such as the impurities precipitated from sugar bearing beet diffusion juices by milk of lime (as disclosed in applicant's copending application for "Method and Apparatus for Purifying Sugar Bearing Diffusion Juices," Ser. No. 552,523, filed December 12, 1955), it is also useful for separating granular precipitates from liquids.

In the drawings:

Fig. 1 is a plan view of the filtration apparatus.

Fig. 2 is a side elevation of the apparatus taken from the side on which the driving means for the filter belt is located.

Fig. 3 is a longitudinal vertical section taken in a plane indicated by line 3—3 in Fig. 1.

Fig. 4 is an end elevational view taken in the direction of the arrow 4 in Fig. 2 with parts such as the filter belt, and the spray manifold omitted for purposes of clarity.

Fig. 5 is a fragmentary plan view of a filter belt swivel conveyor chain embodied in the apparatus, illustrating the manner in which the chain is connected to the filter belt, and the use of a supporting net for the filter belt.

Fig. 6 is a fragmentary vertical sectional view of the filter belt swivel conveyor chain within its guide track, taken in a plane indicated by line 6—6 in Fig. 1.

Fig. 7 is a horizontal sectional plan view taken in a plane indicated by line 7—7 in Fig. 2, showing an open mesh support belt for the filter cloth.

Fig. 8 is a transverse vertical section through the filtration apparatus taken in a plane indicated by line 8—8 in Fig. 2.

Fig. 9 is a fragmentary plan view of the open mesh metal support belt employed for suporting the filter belt.

In greater detail, the filter medium shown in the drawings is in the form of an endless filter belt 2 composed of flexible porous fabric, such as the well known commercially available woven cloth or synthetic fiber filter fabrics. As illustrated in Figs. 5 and 6, both edges of filter belt 2 are attached to swivel conveyor chains 3 by means of coil springs 4 secured to eyelets 6 on the filter belt 2, and to flange atachments 7 on conveyor chain 3. The chain 3 is of the conventional type that permits limited universal movement between connected links so that it can travel in both horizontal and vertical planes, such as the "Link-Belt Swivel Conveyor Chain" sold by the Link-Belt Company.

A pair of chain drive sprockets 8 is fixedly secured to head drive shaft 9, which is journalled for rotation in bearings 11 mounted on frame 12. The drive sprockets 8 and drive shaft 9 respectively engage and drive the conveyor chain 3 and the attached filter belt 2 in the direction of the arrow in Fig. 2. Rotation is imparted to head drive shaft 9 by means of motor 13 through right angle drive speed reducer gear box 14 and chain drive 16. The chain 16 drives sprocket wheel 17 on shaft 9, and thereby causes the drive shaft 9 to rotate.

The upper portion of filter belt 2 extends between head drive shaft 9 and tail shaft 18, which is freely journalled for rotation on bearings 19 secured to frame 12. A pair of guide sprockets 21 is mounted on tail shaft 18 for engaging and guiding the rotating swivel conveyor chains 3. Between the head drive shaft 9 and tail shaft 18, the travel of the swivel conveyor chains 3 during the upper part of their cycle is directed by guide tracks 22. These tracks 22 extend inwardly towards the center line of the filter for a short distance adjacent each of the opposite ends thereof at sprockets 8 and 21, and then run parallel to each other at a distance apart less than the width of filter belt 2. By this arrangement, the lateral distance between chains 3 attached to the edges of filter belt 2 is reduced; and the filter belt then can sag and form a liquid receiving basin 23 between the central parallel portions of guide tracks 22, for receiving the liquid preceipitate to be filtered. As previously mentioned, a shallow basin is utilized for soft precipitates in order to limit the tendency of the liquid being filtered to compress the layer of precipitate into an impervious cake.

Chain guide sprockets 24 mounted on lower filter belt support rollers 26 and tensioning rollers 27 engage and guide the travel of chains 3 on the lower portion of their cycle. Rollers 26 and 27 are freely journalled for rotation in bearings 28 mounted on frame 12. As the filter belt passes underneath the remaining elements of the filter in the lower portion of its cycle of rotation, it is directed by guide sprockets 24 and supported by rollers 26. The lateral distance between each pair of chain drive sprockets 8, and chain guide sprockets 21 and 24 is such that the filter belt 2 lies substantially flat during its entire cycle of rotation, except when it is positioned by guide tracks 22 to form a basin for receiving the liquid that is filtered.

The bottom of filter belt 2 during the upper part of its cycle of rotation is supported on endless open mesh support belt 29, which is driven at the same rate of speed as filter belt 2. Drive for support belt 29 is provided by motor 13 through speed reducer gear box 14, chain drive 31 and sprocket 32 rigidly mounted on support belt head drive shaft 33. Both drive shaft 33 and tail shaft 34 for the support belt 29 are journalled in bearings 36 on frame 12. Support rollers 37 for belt 29, freely rotate in bearings 38 to provide additional support for filter belt 2 and support belt 29. An equalized spiral weave metal open mesh belt with any suitable linkage such as the type illustrated in Fig. 9, is excellent for use as the support belt 29, since it permits passage of the filtrate and yet provides a firm base for support of the moving filter belt 2. This support of the belt is important in preventing distortion and strain in the filter belt and its connecting springs. Where the depth of the filter basin is substantially greater than one foot, the filter belt is advantageously reenforced and held by a fabric net 39 which is secured to flange attachments 7 of conveyor chain 3 by cords 39a, as illustrated in Figs. 5 and 6. In this manner, the fabric net 39 travels along with filter belt 2 and provides added support to the sides of the filter belt 2 when the belt is subjected to the weight of the liquid being filtered.

The slurry of liquid containing the precipitate to be removed by filtration is introduced into the filter through weir pan 40 shown by phantom lines in Figs. 2 and 3, and the slurry then flows into the basin 23 formed in the uppermost portion of filter belt 2. Filtrate from the liquid being filtered passes through the filter belt 2, the support belt 29 and falls onto collecting tray 41, from where it runs into filtrate collecting trough 42, and then into any suitable container, not shown. The precipitate deposited on filter belt 2 is conveyed along with the belt past head drive shaft 9, and then downwards towards rollers 26 and 27. Spray nozzles 43 mounted in manifold 44, direct a stream of water at belt 2 as it moves past the nozzles, thereby dislodging precipitate from the filter belt that has not fallen off the belt due to the effect of gravity. Spray manifold 44 may be connected to any suitable source of water or other fluid under pressure, not shown. The precipitate dislodged from the filter belt 2 falls into precipitate collecting trough 46, from where it is conveyed through sump 47 and conduit 48 by the action of pump 49 into any suitable precipitate collecting tank, not shown.

In order to remove all residual solid material from the pores of filter belt 2, the belt is desirably washed with a suitable chemical cleaning spray before the belt is again presented for filtering additional slurry. The chemical cleaning liquid is introduced into manifolds 51 on each side of the filter belt 2 from any suitable source, not shown, and the liquid is sprayed on the belt through nozzles 52. In order to remove the cleaning liquid from the belt 2, the belt is again washed with water introduced into manifolds 53 and sprayed through nozzles 54 on each side of the filter belt 2. The washings fall into collecting trough 56 and flow out through conduit 57.

In operation, the slurry of liquid and precipitate flows into weir pan 40, which slows the rate of flow of the slurry. The slurry then flows out of pan 40 into the relatively shallow basin 23 formed in the moving filter belt by the spacing of chain drive tracks 3. Open mesh support belt 29 prevents the filter belt from being strained and deformed by the weight of the slurry being filtered, and it is driven at the same lineal speed as the filter belt 2 in order to minimize frictional drag between the revolving belts. The filtrate passes through the filter belt 2, and through open mesh support belt 29 into filtrate collecting tray 41. The inclined collecting tray 41 then directs the flowing filtrate to collecting trough 42. The filtrate is finally collected in any suitable filtrate collecting container, not shown.

Precipitate formed on the filter belt 2 is carried along with the belt in the direction illustrated by the arrow in Fig. 2, past head drive shaft 9, and then downwards towards rollers 26 and 27. Part of the precipitate falls off the filter belt 2 due to the effect of gravity, and the precipitate remaining on the filter belt is washed off by a stream of water emerging from spray nozzles 43. The precipitate is collected in precipitate collecting trough 46 from where it is conveyed for further treatment or for disposal.

The belt 2 is then washed with a suitable chemical cleaner in order to remove solids on the belt and prevent clogging of the pores. Washing is preferably conducted by spraying both sides of the filter belt 2 periodically. It is generally not necessary or economical to employ continuous chemical spraying of the belt. For removing lime and solids that accumulate on the belt in the filtration of limed beet diffusion juices, a solution of one percent hydrochloric acid is satisfactory. The chemical cleaner is washed off so that it will not contaminate the liquid being filtered.

Any type of filter medium may be employed for the filter belt that permits passage of liquid and yet retains the precipitate. However, a filter medium is employed that is sufficiently strong to withstand the strains to which it is subjected due to movement of the apparatus and the pressure of the liquid being filtered. The well known commercially available cloth or synthetic fabric filter media are most suitable for use with the filtration apparatus of this invention. A suitable filter medium for filtering the precipitate of impurities formed by adding lime to a raw beet diffusion juice in the preparation of sugar is the National Filter Media No. 15 filter cloth, which is a plain weave cloth that weighs 12.6 oz. per square yard and has a strand count of 26 by 20 strands per square inch.

I claim:

1. Apparatus for separating liquids from solids by filtration which comprises a frame, an endless belt of filter medium mounted for rotational movement on said frame, drive means for continuously rotating said belt, guides on said frame for guiding said belt, and connecting means slidably mounted on said track guides and secured to said belt, said track guides converging towards each other for a limited distance to form a liquid receiving basin in said filter medium.

2. The apparatus of claim 1 in which said guides are tracks that converge towards each other and run substantially parallel during the intermediate portion of the upper reach of the cycle of rotational movement of said filter medium to form said liquid receiving basin in said filter medium.

3. The apparatus of claim 1 in which said connecting means are a pair of flexible chains attached to the edges of said belt by spring means whereby stress on said belt is reduced, such chains being directed by the guides on said frame.

4. The apparatus of claim 1 in which an endless open mesh support belt for said belt of filter medium is positioned under the liquid receiving basin in said filter medium and provides the bottom of said liquid receiving basin with a substantially flat shape whereby the depth of said basin will be substantially uniform throughout the major portion of said basin, said endless open mesh support belt traveling in the same direction and linear speed as said filter medium.

5. Apparatus for separating liquids from solids by filtration which comprises a frame, and endless filter belt of filter fabric mounted for rotational movement on said frame, a supporting endless fabric net that is adjacent said endless belt and provides support for said filter belt in the upper reach of the cycle of rotation of said filter belt, a pair of flexible chains attached to the edges of said filter belt and said fabric net, guide means on said frame for guiding said flexible chains, said guide means converging towards each other for a limited distance in the upper reach of the cycle of rotational movement of said filter belt to form said filter belt into a receiving basin for the liquid to be filtered, drive means for imparting rotational movement to said filter belt, a filtrate collecting tray, and means apart from said liquid receiving basin for removing precipitate adhering to said filter belt.

6. Apparatus for separating precipitates from liquids by filtration which comprises a frame, an endless filter belt of flexible material mounted for movement on the frame, a supporting endless fabric net adjacent said filter belt which net provides support for said filter belt in the upper reach of the cycle of rotational movement of said filter belt, a pair of flexible chains, resilient means for attaching each of said flexible chains to an edge portion of said filter belt, relatively inelastic means for attaching said fabric net to said pair of flexible chains, track guides guiding such flexible chains on opposite sides of said frame, said guides extending inwardly towards each other for a limited distance in the upper reach of the cycle of rotational movement of said filter belt to form a liquid receiving basin in said filter belt, drive means for imparting rotational movement to said filter belt, an endless open mesh support belt for said filter belt positioned under said basin formed in said filter belt, means for driving said support belt at substantially the same lineal speed as the filter belt, a filtrate collecting tray below said liquid receiving basin and said support belt, and means disposed apart from said liquid receiving basin to remove precipitate adhering thereto.

References Cited in the file of this patent

UNITED STATES PATENTS

| | | |
|---|---|---|
| 965,486 | Putt | July 26, 1910 |
| 1,780,954 | Tomkins | Nov. 11, 1930 |
| 1,881,404 | Hadley | Oct. 4, 1932 |
| 2,197,770 | Pruyn | Apr. 23, 1940 |
| 2,619,232 | Parsons et al. | Nov. 25, 1952 |

FOREIGN PATENTS

| | | |
|---|---|---|
| 612,673 | Germany | May 2, 1935 |
| 63,096 | Denmark | Jan. 2, 1945 |